(12) United States Patent
Chudy et al.

(10) Patent No.: US 9,935,931 B2
(45) Date of Patent: Apr. 3, 2018

(54) AUTHORIZING USER ACCESS TO RESOURCE BY DETERMINING WHETHER OTHER, AUTHORIZED USERS HAVE INDICATED THAT THE USER SHOULD BE PERMITTED ACCESS

(71) Applicant: Lenovo Enterprise Solutions (Singapore) PTE. LTD., New Tech Park (SG)

(72) Inventors: David Daniel Chudy, Raleigh, NC (US); Gary David Cudak, Wake Forest, NC (US); James Gordon McLean, Morrisville, NC (US); Cristian Medina, Morrisville, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/868,196

(22) Filed: Sep. 28, 2015

(65) Prior Publication Data
US 2017/0093831 A1    Mar. 30, 2017

(51) Int. Cl.
*H04L 29/06*    (2006.01)

(52) U.S. Cl.
CPC ............ *H04L 63/08* (2013.01); *H04L 63/102* (2013.01)

(58) Field of Classification Search
CPC ............................. H04L 63/08; H04L 63/102
See application file for complete search history.

(56) References Cited

U.S. PATENT DOCUMENTS

| | | | | |
|---|---|---|---|---|
| 8,176,533 B1* | 5/2012 | Violleau | ............... | H04L 63/083 340/5.81 |
| 8,561,143 B2* | 10/2013 | Cope | ................... | H04L 63/0884 455/410 |
| 2005/0071635 A1* | 3/2005 | Furuyama | ............... | G06F 21/32 713/168 |
| 2010/0153190 A1* | 6/2010 | Matos | .................... | G07C 13/00 705/12 |
| 2011/0107436 A1* | 5/2011 | Cholas | ............... | H04N 21/2541 726/29 |

(Continued)

OTHER PUBLICATIONS

Farroha et al., Architecting dynamic privileges in protected systems through hardening Identity and Access Management, Systems Conference (SysCon), 2012 IEEE International, Apr. 2012.*

(Continued)

*Primary Examiner* — Bradley Holder
*Assistant Examiner* — Harvey Cohen
(74) *Attorney, Agent, or Firm* — Jason Friday

(57) ABSTRACT

A user who is currently unauthorized to access a resource sends a request to access the resource. It is determined whether a number of authorized users of the resource who have indicated that the user should be permitted to access the resource satisfies the threshold condition. If the number of authorized users who have indicated that the user should be permitted access satisfies the threshold condition, the user is permitted to access the resource. The threshold condition can be based on replies received responsive to messages sent to the authorized users of the resource asking whether the user should be permitted to access the resource. The threshold condition can be based on public digital keys of the authorized users from the user.

12 Claims, 3 Drawing Sheets

(56) References Cited

U.S. PATENT DOCUMENTS

| | | | | |
|---|---|---|---|---|
| 2014/0237562 A1* | 8/2014 | Nandakumar | .......... | G06F 21/36 726/5 |
| 2015/0096049 A1* | 4/2015 | Mattsson | ............ | G06F 21/6227 726/27 |
| 2015/0150110 A1* | 5/2015 | Canning | ............. | H04L 63/0807 726/9 |
| 2015/0213195 A1* | 7/2015 | Blechman | ............. | G06F 19/322 705/51 |

OTHER PUBLICATIONS

Hameed et al.,A model for ensuring data confidentiality: In healthcare and medical emergency, IEEE Mechatronics (ICOM), 2011 4th International Conference On, May 2011.*

Abdulaziz et al, Authorized Access Denied Unauthorized Access Granted, ACM, 2013 Proceedings of the 6th International Conference on Security of Information and Networks, Nov. 2013.*

Safiq et al, Access control management in a distributed environment supporting dynamic collaboration, ACM Proceeding DIM '05 Proceedings of the 2005 workshop on Digital identity management pp. 104-112, Nov. 2005.*

"Grant Temporary Admin Access for Assistance", Salesforce, online <https://success.salesforce.com/ideaView?id=08730000000Kr . . . >, accessed Sep. 28, 2015, webpage dated no later than Sep. 21, 2011.

* cited by examiner

AUTHORIZING USER ACCESS TO RESOURCE BY DETERMINING WHETHER OTHER, AUTHORIZED USERS HAVE INDICATED THAT THE USER SHOULD BE PERMITTED ACCESS

BACKGROUND

Computing resources can include both hardware resources, such as servers, printers, and so on, as well as software resources, such as data, files, programs, and so on. Many resources do not require authorization to access. For example, so long as a user is able to connect to a web server or can access the storage device on which a file is stored, accessing the web server or the file is permitted. Other resources, however, have restricted access, and users have to have authorization to access them. For example, to access a server, the user may have to have a username and password, and to access a file, the user may have to know the password needed to open the file.

SUMMARY

An example method includes receiving a request to access a resource from a user who is currently unauthorized to access the resource. The method includes, in response to receiving the request, determining whether a number of authorized users of the resource who have indicated that the user should be permitted to access the resource satisfies a threshold condition. The method includes, in response to determining that the sufficient number of authorized users who have indicated that the user should be permitted to access the resource satisfies the threshold condition, permitting the user to access the resource.

An example system includes a resource, a processor, and a non-transitory computer-readable data storage medium storing computer-executable code. The processor executes the code to receive a request to access the resource from a user who is currently unauthorized to access the resource. The processor executes the code to, in response to receiving the request, determine whether a number of authorized users of the resource who have indicated that the user should be permitted to access the resource satisfies the threshold condition. The processor executes the code to, in response to determining that the sufficient number of authorized users who have indicated that the user should be permitted to access the resource satisfies the threshold condition, permit the user to access the resource.

An example non-transitory computer-readable data storage medium stores computer-executable code executable by a mobile computing device of a user who is currently unauthorized to access a resource to perform a method. The method includes communicating with mobile computing devices of authorized users of the resource to receive public digital keys of the authorized users. The method includes sending to a management component a request to access the resource and the public digital keys of the authorized users. The method includes receiving from the management component permission to access the resource when the public digital keys of the authorized users that have been sent satisfies a threshold condition. The method includes not receiving from the management component permission to access the resource when the public digital keys of the authorized users that have been sent does not satisfy the threshold condition.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
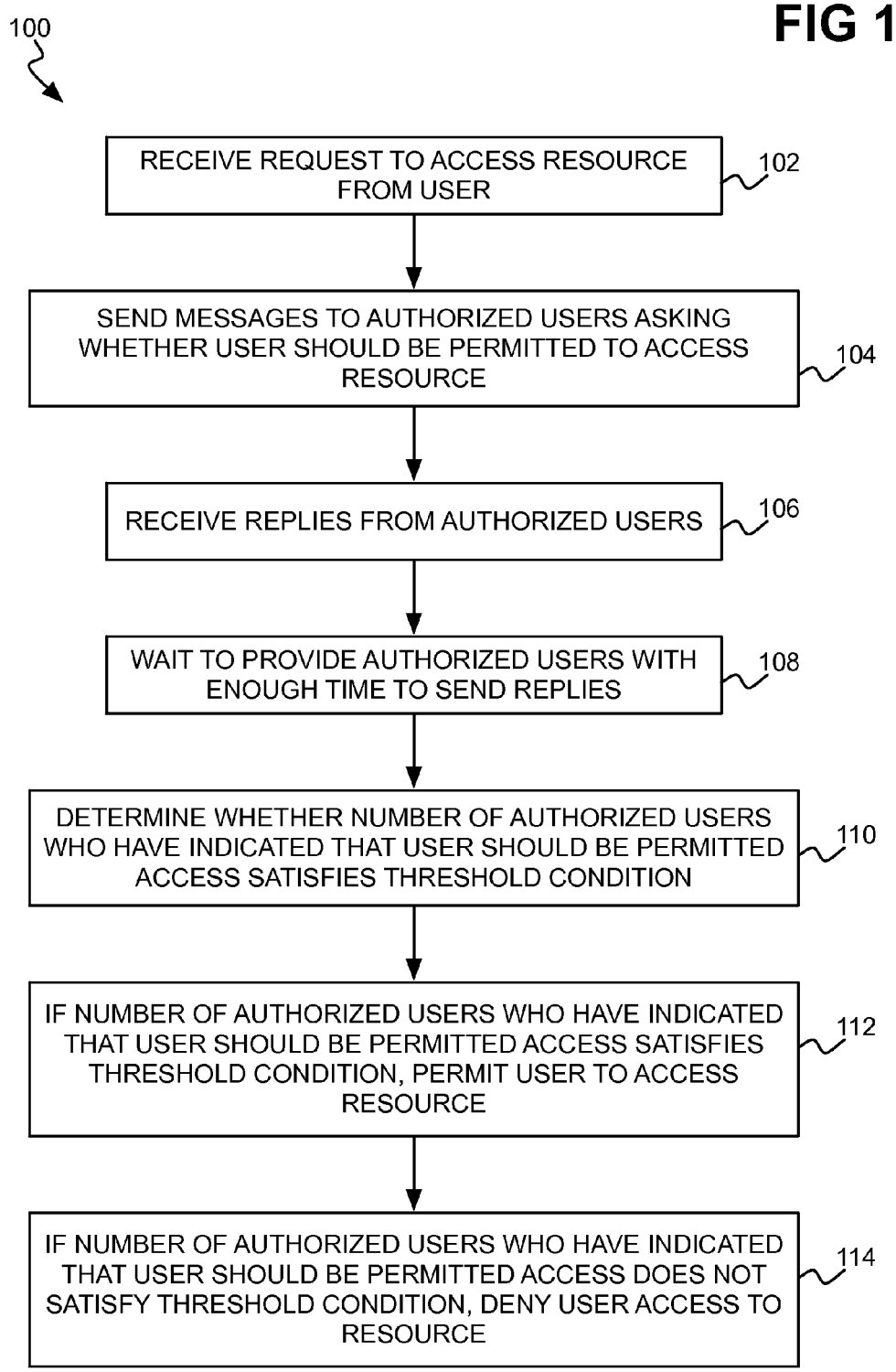
FIG. 1 is a flowchart of an example method by which authorized users of a resource can approve a currently unauthorized user to access the resource.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, some types of computing resources can require users to have authorization to access them. Conventional authorization approaches include providing the user with a username and a password to obtain access to a resource, or providing the user with the password to obtain access when just a password is needed. Such approaches can require significant overhead. For example, a user who needs one-time access to a server may nevertheless require that a network administrator set up an account for the user, including a username and password. As another example, a user who needs access to a file like a word processing document may have to be provided with the password to the document if the document has been password-protected.

Techniques disclosed herein provide a different way by which to provide users with authorization to access resources, which does not rely on providing the user with a username, password, or other credentials by which to access the resources. Rather, the techniques disclosed herein rely upon a sufficient number of users who are authorized to access a resource indicating that a user who is not currently authorized to access the resource be permitted access. For example, when a user requests to access a resource, messages may be sent to authorized users of the resource asking whether the user should be nevertheless permitted to do so. As another example, the user may ahead of time receive approval from authorized users of the resource giving the user permission to access the resource, via receiving public keys of the authorized users.

As such, the user does not have credentials particular to him or her to access a resource. The user does not have to have an administrator set up an account by which the user logs on to the resource, even if other authorized users of the resource do not have accounts and associated usernames and passwords to access the resource. The user does not have to have a password to access the resource, even if the resource is password-protected. In effect, the existing authorized users of a resource vouch for the currently unauthorized user, by indicating that the user should be permitted to access the resource such that it is implied that the user is sufficiently trustworthy to receive access. When the number of such authorized users who vouch for the currently unauthorized user satisfies a threshold condition, providing this user with access to the resource can be considered appropriate.

FIG. 1 shows an example method 100 by which messages are sent to authorized users of a resource when a user who is not currently authorized to access the resource requests to do so. The method 100 may be performed by a computing device, such as the computing device on which the resource resides, or a computing device that manages access to the resource when the resource resides on a different computing device. The resource may be a software or a hardware resource. Examples of hardware resources include server computing devices, printing devices, storage devices, and so on. Examples of software resources include computer programs and data files, such as word processing documents, spreadsheet documents, and so on.

The resource may further be an action that is performed in relation to a software or a hardware resource. For example, the action may be to save a word processing document that a user is able to open and modify, but who is not permitted to save the document due him or her lacking the password for saving the document or otherwise not having authorization to save the file. As another example, a user may have permission to view the status of a resource like a server, but may not have permission to perform a power action, such as reboot or shutdown, in relation to the server. When the resource is an action, then, having access to the resource means being able to perform the action in question.

A request to access the resource is received from a user who is currently unauthorized to access the resource (102). The user may or may not be aware that authorization is required to access the resource. As an example of the former, the user may be presented with a login prompt requesting that the user enter credentials such as a username and a password that the user does not have. The login prompt may further provide an option by which authorization can be alternatively obtained by requesting authorized users of the resource (i.e., those who already have credentials to access the resource) vouching for the user, either on a one-time basis, or on a continuing basis.

As an example of the latter, the user may attempt to connect to a storage device or a printing device, or attempt to open a computer program or a particular data file, where the user is unaware that access to the resource is restricted to authorized users. In this case, the request to access the resource can be considered as implicit, in that the user is unaware that authorization is required. In general, the request to access the resource is made by the user on a computing device thereof, such as a mobile computing device like a smartphone, or a laptop or desktop computer. Further, the request to access can include identifying information of the user or the user's device.

In response to receiving the request, messages are sent to at least a subset of the authorized users, asking whether the user should be permitted to access the resource (104). The message sent to each authorized user can include the identifying information of the user and/or the computing device by which the user made the access request. The message can also include identifying information of the resource in question. The messages can be sent to the authorized users in a number of different ways, such as by sending email messages to email addresses of the authorized users, sending text messages to mobile computing devices of the authorized users, and so on.

In one implementation, part 104 is automatically performed responsive to the user requesting access in part 102, but being denied such access. As noted above, the user may (or may not) be aware that he or she is unauthorized to access a resource. When the user attempts to access the resource, such access is thus denied. In this case, part 104 can be automatically performed. That is, as soon as resource access is denied, the messages are sent in part 104. Stated another way, the denial of authorization serves as a trigger to the messages being sent in part 104. This implementation can be advantageous, because it results in a seamless process performed in the background by which a user can receive access to a resource. When the authorization failure occurs, the messages are thus automatically sent to the authorized users asking if the user in question should receive access.

Replies to the messages are received from the authorized users (106). Each reply indicates whether the authorized user who sent the reply has stated that the user who is not currently authorized to access the resource should or should not be permitted to access the resource. Replies may be made in the same mode of communication, such as email or text message, as the messages sent to the authorized users. Replies may not be received from all the authorized users. A predetermined length of time is waited, however, to provide the authorized users with enough time to send replies (108) in one implementation.

It is determined whether a number of authorized users who have indicated that the requesting user should be permitted access to the resource satisfies a threshold condition (110), based on the replies received from the authorized users. The threshold condition can be defined in a number of different ways. For example, the threshold condition may be defined as a threshold percentage of the authorized users to whom messages were sent in part 104 having sent replies indicating that the user should be permitted access to the resource. The other authorized users may have sent replies indicating that the user should not be permitted access, or may not have sent replies. As another example, the threshold condition may be defined as a predetermined (minimum) number of the authorized users to whom the messages were sent in part 104 having sent replies indicating that the user should be permitted access, where the other authorized users may have sent replies indicating that the user should not be permitted access, or may not have sent replies, as before.

In one implementation, the predetermined length of time that is waited in part 108 may be shortened once and if the number of authorized users who have indicated that the requesting user should be permitted access satisfies the threshold condition in part 110. For example, the predetermined length of time may be ten minutes. If seven minutes after sending the messages to the authorized users in part 104 a number of authorized users who have sent replies indicating that the requesting user should be permitted access in part 106 satisfies the threshold condition, then the remaining three minutes of the predetermined length of time are not waited.

If the number of authorized users who have indicated that the user should be permitted access to the resource satisfies the threshold condition, then the user is permitted to access the resource (112). If the number of authorized users who have indicated that the user should be permitted access does not satisfy the threshold condition, however, then the user is refused access to the resource (114). In this way, then, a user who does not currently have access to a resource does not have to have even a temporary username and/or password assigned to him or her to access the resource. Rather, other, authorized users effectively vouch for the user, thus permitting the user to access the resource.

In one implementation, permitting the user to access the resource can include the following. In relation to the resource, the user may have a particular user access role of a level insufficient for the user to access the resource. Therefore, permitting the user to access the resource can include at least temporarily elevating the level of the user's user access role so that it is sufficient to access the resource. For example, if the user has a user access role of guest, the role may be elevated to general user or administrator. As another example, if the user has a user access role of general user, the role may be elevated to administrator.

In general, permitting the user to access the resource can be provided in a limited or unlimited manner. Examples of limited manners include permitting the user one-time or a time-limited access to the resource. In the case of the former, if the resource is a particular action to be performed, the user may be permitted to perform the action just once. In the case of the latter, if the resource is hardware or software resource, the user may be permitted to access the resource for a limited duration of time. As to the unlimited manner, the user may be permanently accorded access to the resource. As such, in the case of an action, the user can re-perform the action indefinitely, and in the case of a software or hardware resource, the user can access this resource indefinitely.

In the example method 100, the requesting user has to wait for the number of authorized users who approve the user's request to access the resource satisfying the threshold condition after the user has made the request. If there is a large number of authorized users, the wait may be relatively brief when the threshold condition is defined appropriately. For example, if there are one-hundred authorized users of a resource, and just five authorized users have to give approval for the requesting user to obtain access to the resource as the threshold condition, then the likelihood that the requesting user will quickly receive access to the resource (assuming that the authorized users will vouch for him or her) is high.

However, in other scenarios, there may be a relatively small number of authorized users, and/or the threshold condition may be defined such that a relatively large percentage of the authorized users have to approve the requesting user's access to the resource. For example, a word processing document may have two authorized users: the creator of the document, and the network administrator in charge of the storage device on which the document resides. If the former user is on vacation, and the latter user is tied up in a meeting, for instance, then the requesting user may not receive approval to access the document in a reasonable length of time after attempting to open the document. Therefore, another implementation that is now described permits the user to in effect receive preapproval to access a resource, from authorized users, before attempting to access the resource.

Figure 2:
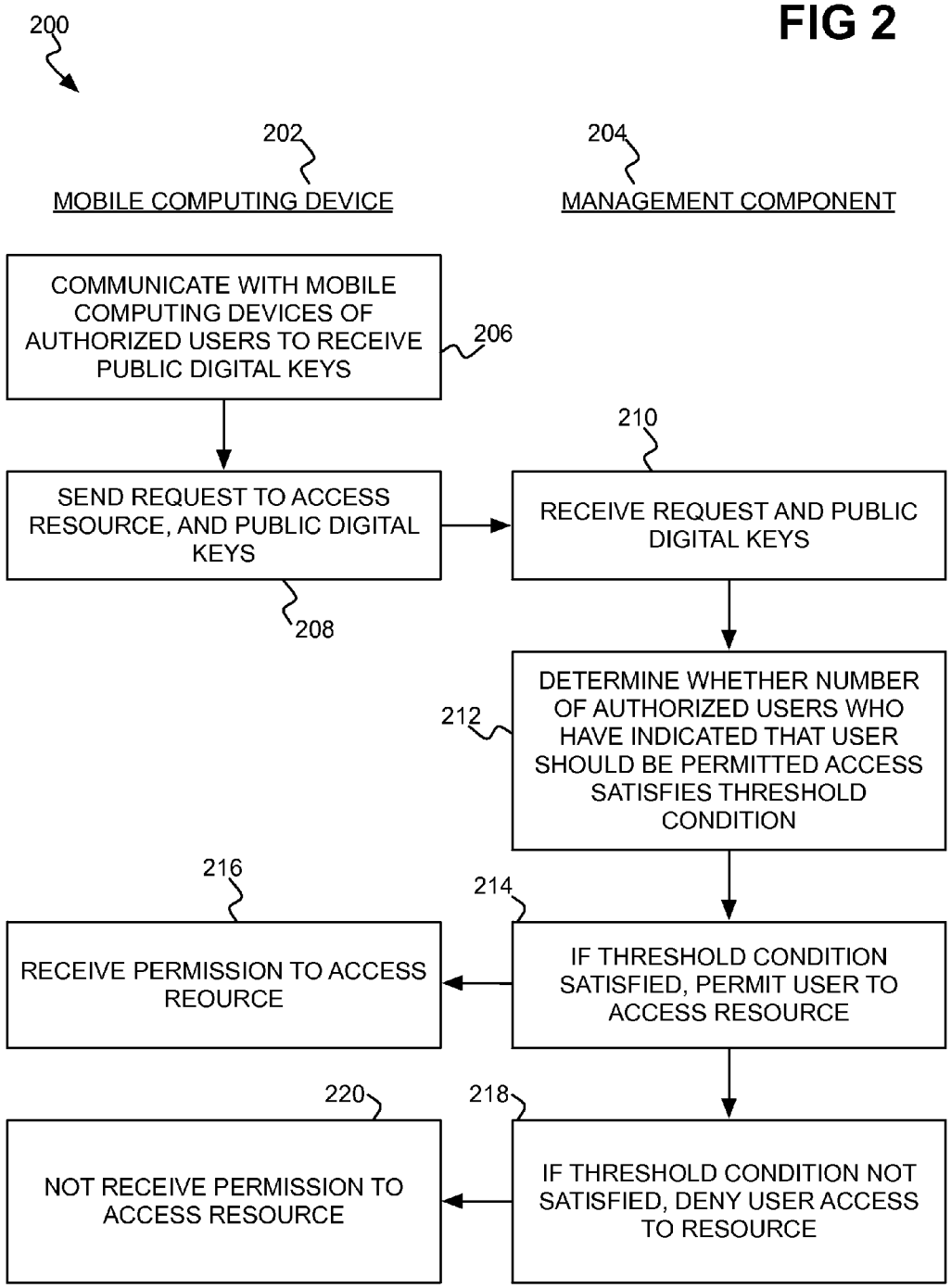
FIG. 2 is a flowchart of another example method by which authorized users of a resource can approve a currently unauthorized user to access the resource.
Figure 3:
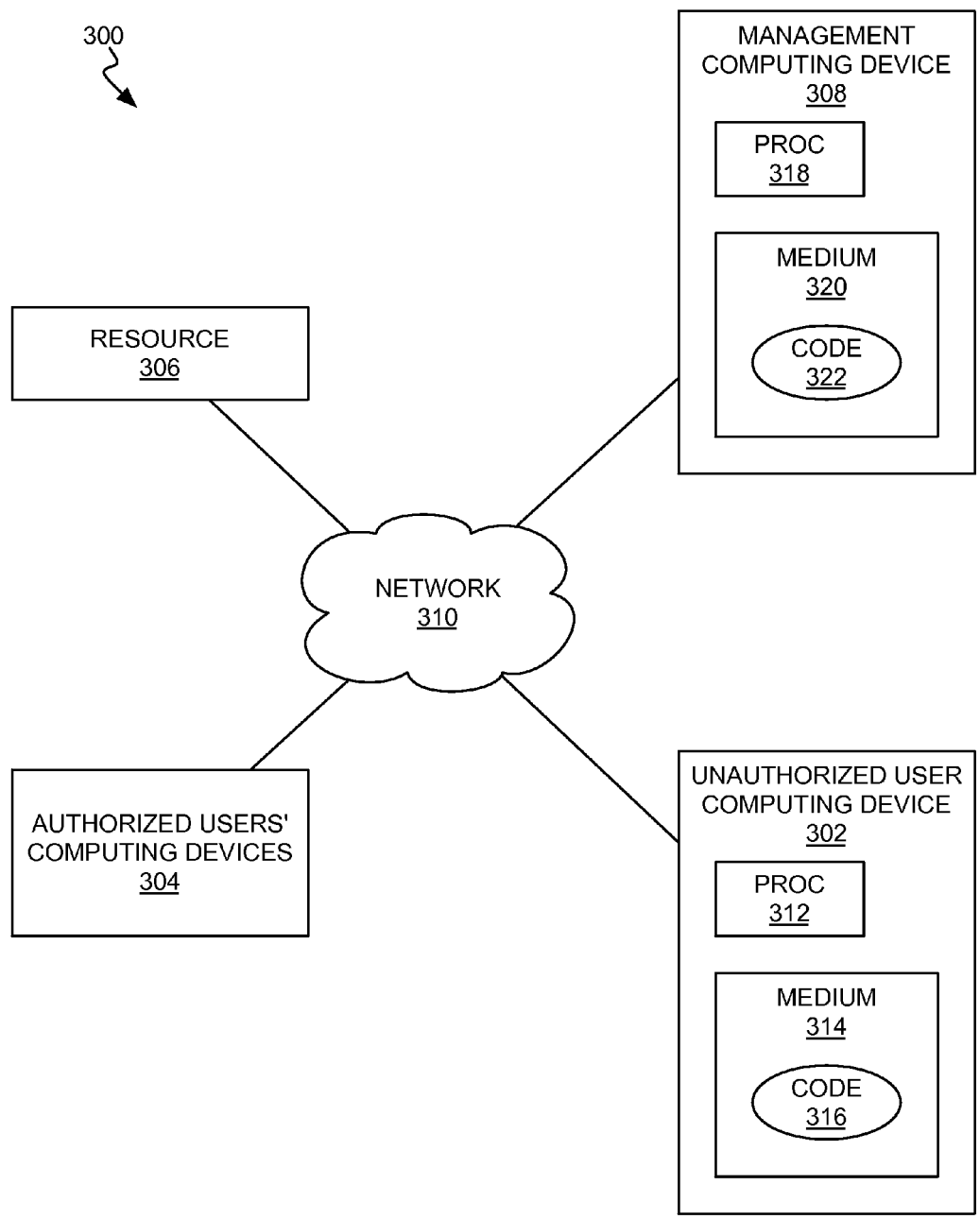
FIG. 3 is a diagram of an example system in which authorized users of a resource can approve a currently unauthorized user to access the resource.

FIG. 2 shows an example method 200 by which a user who wants access to a resource but is not currently authorized to do so obtains the digital public keys of authorized users of the resource. The parts of the method 200 in the left-hand column of FIG. 2 are performed by a mobile computing device 202, such as a smartphone, of a user who is not currently authorized to access a resource. The parts of the method 200 in the right-hand column of FIG. 3 are performed by a management component 204 for the resource. The management component 204 may be a software component, a hardware component, or both a software and a hardware component. The component 204 may be part of the resource itself, or may be or be located at a different computing device than that of the resource. For example, if the resource is a server computing device, the management component 204 may be part of this server, or part of a different server computing device that manages the resource, including access to the resource.

The mobile computing device 202 communicates with mobile devices of authorized users to receive public digital keys of the authorized users of the resource (206). A public digital key can be the public cryptographic key of a digital certificate that also includes a private cryptographic, or digital, key. A digital certificate is a digital document used for security purposes. Each authorized user of the resource may have a digital certificate. The public digital key is freely shareable, and can be authenticated against a certificate authority (CA) and/or against the private digital key of the same digital certificate to authenticate the user thereof.

For example, the user of the mobile computing device 202 can establish peer-to-peer wireless connections with the mobile computing devices of the authorized users to receive the public digital keys therefrom. The peer-to-peer wireless connection may be a near field communication (NFC) connection, a Bluetooth connection, or a Wi-Fi direction connection. In general for such a peer-to-peer wireless connection to be established, the two mobile computing devices are placed in close proximity with one another. One device initiates the connection, and the other device accepts the connection. Once the wireless connection has been established, the public digital key can be transferred over the connection.

The user of the mobile computing device 202 then sends a request to access the resource, along with the public digital keys of the authorized users that have been acquired (208). The management component 204 receives this request as well as the public digital keys (210). The component 204 then determines whether the number of authorized users who have indicated that the user of the mobile computing device 202 should be permitted access satisfies a threshold condition (212), based on the public digital keys of the authorized users that have been received from the mobile computing device 202 in part 210.

The threshold condition can be defined in a number of different ways. For example, the threshold condition may be defined as a threshold percentage of the authorized users of whom public digital keys have been received in part 210. The public digital keys of the other authorized users may not have been received, for instance. As another example, the threshold condition may be defined as a predetermined (minimum) number of the authorized users of whom public digital keys have been received in part 210. As before, the public digital keys of the other authorized users may not have been received.

Because in theory the public digital keys of authorized users may be obtained without approval of the authorized users—since by definition these keys are public, and may be stored on publicly available storage devices, for instance— in one implementation further assurance is made that the user of the mobile computing device 202 has received approval to access the resource from these authorized users. Specifically, the user does not receive the complete public digital key of each authorized user in part 206, but rather only a portion of the key, such as a predetermined number of specific bits thereof. Besides determining whether public digital keys of a threshold percentage or a predetermined number of the authorized users have been received in part 212, the management component 204 also ensures that just the correct portions of these keys have been received. If the correct portions have not been received, or if other portions of the keys in addition to the correct portions have been received, then it is deemed that the threshold condition has not been satisfied.

If the threshold condition has been satisfied, then the user of the mobile computing device 202 is permitted to access the resource (214). The mobile computing device 202 thus receives permission from the management component 204 to access the resource (216). By comparison, if the threshold condition has not been satisfied, then the user of the mobile computing device 202 is denied access to the resource (218), and the mobile computing device 202 does not receive permission to access the resource (220).

In the example method 200, the requesting user does not have to wait for the sufficient number of authorized users to approve the user's request to access the resource, because the requesting user effectively receives preapproval from these authorized users in the form of their public digital keys. As an example, a user may know that he or she will need one-time access to a password-protected file at some point in the future. The user may thus obtain the public digital key of the creator of the file, from this authorized user, ahead of time, in lieu of receiving the password itself. Therefore, when the user needs access to the file, he or she already has received approval from the authorized user, and just has to send the request to access the file and the public digital key of the file's creator to the management component 204.

FIG. 3 shows an example system 300 within which the methods 200 and 300 that have been described can be performed. The system 300 includes computing devices 302 and 304, and a resource 306. The computing device 302 is the computing device of a user who is currently unauthorized to access the resource 306. By comparison, the computing devices 304 are the computing devices of the users who are authorized to access the resource 306. The computing devices 302 and 304 can be mobile computing devices like smartphones, or other types of computing devices, such as desktops or laptop computers, and so on.

The system 300 can include a management computing device 308 separate from the resource 306. However, in another implementation, the resource 306 can be a part of the computing device 308. The computing device 308 manages access to the resource 306, where the resource 306 can be a hardware resource or a software resource as has been described. The computing devices 302, 304, and 308, and the resource 306, may communicatively interconnect with one another over a network 310. The network 310 may be or include local-area networks (LANs), wide-area networks (WANs), intranets, extranets, the Internet, mobile telephony networks, wired networks, wireless networks, and so on.

The computing device 302 includes a processor 312 and a non-transitory computer-readable data storage medium 314 storing computer-executable code 316 that the processor 312 can execute. Similarly, the computing device 308 includes a processor 318 and a non-transitory computer-readable data storage medium 320 storing computer-executable code 322 that the processor 318 can execute. The processor 312 of the computing device 302 can execute the code 316 stored on the medium 314 to perform the method 200, whereas the processor 318 of the computing device 308 can execute the code 322 stored on the medium 320 to perform the method 100. The computing devices 302 and 308—as well as the computing devices 304—can each include additional components, besides those depicted in FIG. 3.

The techniques that have been described herein thus permit a user who is currently unauthorized to access a resource—in that, for instance, the user does not have a username and/or a password associated with the resource—to nevertheless do so without having to associate credentials of the user with the resource. Rather, the user is permitted to access the resource after having received approval from a sufficient number of users who are already authorized to access the resource. These authorized users in effect vouch for the user who is currently unauthorized to access the resource.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   receiving, by a computing device, a request to access a resource from a user who is currently unauthorized to access the resource, the resource being one of a hardware resource, a software resource, and an action performed in relation to the hardware resource or the software resource;
   sending, by the computing device at a first time and in response to receiving the request, messages to authorized users of the resource asking whether the user should be permitted to access the resource;
   waiting, by the computing device, for a length of time between the first time and a second time;
   receiving, by the computing device during the length of time between the first time and the second time and after sending the messages to the authorized users, a plurality of replies from the authorized users, each reply indicating that the user should be or should not be permitted to access the resource;
   determining, by the computing device at a third time after the second time, whether a sufficient number of the authorized users of the resource who have indicated that the user should be permitted to access the resource satisfies a threshold condition;
   permitting, by the computing device in response to determining that the sufficient number of the authorized users who have indicated that the user should be permitted to access the resource satisfies the threshold condition, the user to access the resource, the user subsequently accessing the resource; and
   denying, by the computing device in response to determining that the sufficient number of authorized users who have indicated that the user should be permitted to access the resource does not satisfy the threshold condition, the user access to the resource.

2. The method of claim 1, wherein receiving the request to access the resource from the user comprises:
   implicitly receiving the request to access the resource from the user by the user attempting to access the resource where the user is unaware that the user does not have authorization to access the resource.

3. The method of claim 1, wherein the threshold condition is a percentage of the authorized users to which the messages have been sent.

4. The method of claim 1, wherein receiving the request to access the resource from the user results in a denial of the user to access the resource, the denial being an automatic trigger to automatically sending the messages to the authorized resource.

5. The method of claim 1, wherein sending the messages to the authorized users comprises one of:
sending text messages to mobile computing devices of the authorized users;
sending email messages to email addresses of the authorized users.

6. The method of claim 1, further comprising:
receiving a plurality of public digital keys of the authorized users from the user,
wherein the threshold condition is based on the public digital keys of the authorized users received from the user.

7. The method of claim 6, wherein just a portion of each public digital key is received from the user, and wherein the threshold condition comprises whether a correct portion of each public digital key has been received from the user.

8. The method of claim 1, wherein the user has a user access role insufficient to access the resource,
and wherein permitting the user to access the resource comprise at least temporarily elevating the user access role of the user to a level sufficient to access the resource.

9. The method of claim 6, wherein the user previously has obtained the public digital keys by establishing peer-to-peer wireless connections with the authorized users using one or more of: a near field communication (NFC) connection, a Bluetooth connection, and a Wi-Fi Direct connection.

10. A system comprising:
a resource, the resource being one of a hardware resource, a software resource, and an action performed in relation to the hardware resource or the software resource;
a hardware processor;
a non-transitory computer-readable data storage medium storing computer-executable code that the hardware processor executes to:
receive a request to access the resource from a user who is currently unauthorized to access the resource;
send, in response to receiving the request, messages at a first time to authorized users of the resource asking whether the user should be permitted to access the resource;
wait for a length of time between the first time and a second time;
receive, during the length of time between the first time and the second time, and after sending the messages to the authorized users, a plurality of replies from the authorized users, each reply indicating that the user should be or should not be permitted to access the resource;
determine, at a third time after the second time, whether a sufficient number of the authorized users of the resource who have indicated that the user should be permitted to access the resource satisfies a threshold condition; and
permit, in response to determining that the sufficient number of authorized users who have indicated that the user should be permitted to access the resource satisfies the threshold condition, the user to access the resource, the user subsequently accessing the resource;
deny, in response to determining that the sufficient number of authorized users who have indicated that the user should be permitted to access the resource does not satisfy the threshold condition, the user access to the resource.

11. The system of claim 10, wherein the threshold condition is based on the replies received from the authorized users.

12. The system of claim 10, wherein the hardware processor executes the computer-executable to further:
receive a plurality of public digital keys of the authorized users from the user,
wherein the threshold condition is based on the public digital keys of the authorized users received from the user.

* * * * *